United States Patent
Tang

(10) Patent No.: US 11,128,418 B2
(45) Date of Patent: Sep. 21, 2021

(54) METHOD FOR TRANSMITTING REFERENCE SIGNAL, AND COMMUNICATION DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/461,352

(22) PCT Filed: Nov. 18, 2016

(86) PCT No.: PCT/CN2016/106417
§ 371 (c)(1),
(2) Date: May 15, 2019

(87) PCT Pub. No.: WO2018/090327
PCT Pub. Date: May 24, 2018

(65) Prior Publication Data
US 2020/0067669 A1 Feb. 27, 2020

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04B 7/0626* (2013.01);
(Continued)

(58) Field of Classification Search
CPC ... H04L 5/0048; H04L 5/0007; H04B 7/0456; H04B 7/0626; H04B 7/0617; H04W 72/042; H04W 7/0446; H04J 1/02
See application file for complete search history.

(56) References Cited

U.S. PATENT DOCUMENTS

| | | | |
|---|---|---|---|
| 9,516,644 B2 | 12/2016 | Pan | |
| 2012/0127938 A1* | 5/2012 | Lv | H04W 72/1205 370/329 |

(Continued)

FOREIGN PATENT DOCUMENTS

| | | |
|---|---|---|
| CN | 102300270 A | 12/2011 |
| CN | 103716273 A | 4/2014 |

(Continued)

OTHER PUBLICATIONS

NTT DOCOMO:"Reference Signal Design for NR Beam Management", 3GPP Draft; R1-1612727 RS Design for NR Beam Mamagement, 3rd Generation Partnership Project (3GPP), Mobile Competence Centre ; 650, Route Des Lucioles ; F-06921 Sophia-Antipolis Cedex ; France vol. RAN WG1, No. Lisbon, Portugal; Oct. 10, 2016-Oct. 14, 2016 Nov. 13, 2016 (Nov. 13, 2016), XP051176670.

(Continued)

*Primary Examiner* — Brenda H Pham
(74) *Attorney, Agent, or Firm* — Ladas & Parry, LLP

(57) ABSTRACT

Disclosed are a method for transmitting a reference signal, and a communication device. The method is executable by a terminal device or a network device, and comprises: determining at least one time domain resource unit for transmitting a reference signal; and transmitting the reference signal on the at least one time domain resource unit. Since the reference signal is transmitted on the at least one specific time domain resource unit rather than being transmitted by reusing a portion of subcarriers of a time domain resource unit for data transmission, a delay in transmission (Continued)

of the reference signal is reduced, thereby reducing a delay in data demodulation or CSI measurement performed on the basis of the reference signal, and reducing control signaling overhead for indication of a rate matching resource and complexity of performing rate matching.

20 Claims, 4 Drawing Sheets

(51) Int. Cl.
    *H04B 7/06*     (2006.01)
    *H04W 72/04*     (2009.01)
    *H04J 1/02*     (2006.01)
    *H04J 3/02*     (2006.01)

(52) U.S. Cl.
    CPC ......... *H04L 5/0007* (2013.01); *H04W 72/042* (2013.01); *H04B 7/0617* (2013.01); *H04J 1/02* (2013.01); *H04J 3/02* (2013.01); *H04W 72/0446* (2013.01)

(56) References Cited

U.S. PATENT DOCUMENTS

| | | | |
|---|---|---|---|
| 2013/0114756 | A1 | 5/2013 | Jia et al. |
| 2013/0208669 | A1 | 8/2013 | Pan |
| 2013/0343477 | A9 | 12/2013 | Jia et al. |
| 2015/0063177 | A1 | 3/2015 | Kim et al. |
| 2015/0201406 | A1 | 7/2015 | Zhang |
| 2015/0327244 | A1* | 11/2015 | Pajukoski ............. H04L 5/0003 370/330 |
| 2016/0192385 | A1 | 6/2016 | Tooher et al. |
| 2016/0352551 | A1* | 12/2016 | Zhang ................. H04L 27/2646 |
| 2017/0126379 | A1* | 5/2017 | Choi ..................... H04L 1/0027 |
| 2017/0331602 | A1* | 11/2017 | Hugl ..................... H04L 5/0094 |
| 2018/0062811 | A1* | 3/2018 | Akkarakaran ...... H04L 25/0222 |
| 2018/0139014 | A1* | 5/2018 | Xiong ................... H04L 1/1861 |
| 2018/0324837 | A1 | 11/2018 | Tooher et al. |
| 2019/0081841 | A1* | 3/2019 | Kim ....................... H04L 27/26 |

FOREIGN PATENT DOCUMENTS

| | | |
|---|---|---|
| CN | 104104637 A | 10/2014 |
| CN | 107645352 A | 1/2018 |
| JP | 2016510548 A | 4/2016 |
| RU | 2600569 C2 | 10/2016 |

OTHER PUBLICATIONS

AT&T:"CSI-RS Design for Mixed Numerology Support in NR", 3GPP Draft; R1-1612367 CSI-RS Design for Mixed Numerology Support in NR, 3rd Generation Partnership Project (3GPP), Mobile Competence Centre ; 650, Route Des Lucioles ; F-06921 Sophia-Antipolis Cedex, vol. RAN WG1, No. Reno, USA; Nov. 14, 2016-Nov. 18, 2016 Nov. 13, 2016 (Nov. 13, 2016), XP051176315.
Extended European Search Report in the European application No. 16921900.3 dated Oct. 1, 2019.
English translation of the Written Opinion of the International Search Authority in the international application No. PCT/CN2016/106417, dated Aug. 9, 2017.
International Search Report in international application No. PCT/CN2016/106417, dated Aug. 9, 2017 and its EN translation provided by WIPO.
Written Opinion of the International Search Authority in international application No. PCT/CN2016/106417, dated Aug. 9, 2017 and its EN translation provided by Google translate.
First Office Action of the Chilean application No. 201901357, dated Mar. 2, 2020.
First Office Action of the Chinese application No. 201680090942.0, dated May 7, 2020.
First Office Action of the Singaporean application No. 11201904466T, dated May 14, 2020.
Notice of Allowance of the Russian application No. 2019118874, dated Apr. 2, 2020.
First Office Action of the Canadian application No. 3044093, dated Jun. 9, 2020.
Huawei, HiSilicon, "UL SRS Design for CSI Acquisition and Beam Management", 3GPP TSG RAN WG1 Meeting #87, R1-1611678, Nov. 5, 2016.
Qualcomm Incorporated, "Views on DL DMRS", 3GPP TSG-RAN WG1 #87, R1-1612051, Nov. 5, 2016.
Second Office Action of the Chinese application No. 201680090942.0, dated Aug. 10, 2020.
First Office Action of the Russian application No. 2019118874, dated Dec. 17, 2019.
Second Office Action of the Chilean application No. 201901357, dated Aug. 19, 2020.
First Office Action of the Indian application No. 201917021447, dated Sep. 3, 2020.
First Office Action of the Brazilian application No. BR1120190100490, dated Sep. 15, 2020.
Third Office Action of the Chinese application No. 201680090942.0, dated Nov. 2, 2020.
First Office Action of the Israel application No. 266710, dated Dec. 9, 2020.
First Office Action of the Taiwanese application No. 106138251, dated Jan. 29, 2021.
Huawei et al., DL DM-RS for data transmissions, 3GPP TSG RAN WG1#87, Internet<URL:http://www.3gpp.org/ftp/tsg_ran/WG1_RL1/TSGR1_87/Docs/R1-1611244.zip>, Nov. 5, 2016, R1-1611244.
Samsung, DMRS Design Aspects for NR, 3GPP TSG RAN WG1#87, Internet<URL:http://www.3gpp.org/ftp/tsg_ran/WG1_RL1/TSGR1_87/Docs/R1-1612497.zip>, Nov. 4, 2016, R1-1612497.
LG Electronics, Discussion on Variable Density for NR DMRS, 3GPP TSG RAN WG1#87, Internet<URL:http://www.3g pp.org/ftp/tsg_ran/WG1_RL1/TSGR1_87/Docs/R1-1611814.zip>, Nov. 5, 2016, R1-1611814.
First Office Action of the Japanese application No. 2019-526579, dated Feb. 26, 2021.
First Office Action of the European application No. 16921900.3, dated Mar. 15, 2021.
Second Office Action of the Canadian application No. 3044093, dated Jul. 12, 2021.

* cited by examiner

METHOD FOR TRANSMITTING REFERENCE SIGNAL, AND COMMUNICATION DEVICE

CROSS-REFERENCE TO RELATED APPLICATION

The present application is the US national phase filing of PCT application No. PCT/CN2016/106417 filed on Nov. 18, 2016, the disclosure of which is incorporated herein by reference in its entirety.

TECHNICAL FIELD

Embodiments of the disclosure relate to the field of wireless communication, and more particularly to an uplink data transmission method and a communication device.

BACKGROUND

In a Long Term Evolution (LTE) system, Frequency Division Multiplexing (FDM) is usually adopted for a downlink reference signal and downlink data. A reference signal may be transmitted on part of subcarriers of a symbol for data transmission. In this case, a terminal device may detect the reference signal only after receiving multiple Orthogonal Frequency Division Multiplexing (OFDM) symbols. Therefore, there may be a relatively long latency in data demodulation or Channel State Information (CSI) measurement based on the reference signal.

SUMMARY

The embodiments of the disclosure provide a method for transmitting a reference signal and a communication device, which may reduce a latency brought by reference signal transmission.

A first aspect provides a method for transmitting a reference signal, which may be executed by a terminal device or a network device. The method includes the following operations. At least one time-domain resource unit for transmitting a reference signal is determined. The reference signal is transmitted on the at least one time-domain resource unit.

In such a manner, the reference signal is not transmitted by multiplexing part of subcarriers on a time-domain resource unit for transmitting data, but transmitted through the at least one specific time-domain resource unit, so that a reference signal transmission latency is reduced. Therefore, the latency in data demodulation or CSI measurement based on the reference signal is reduced, and meanwhile, a control signaling overhead for indicating a rate-matching resource and rate-matching complexity are also reduced.

In at least one embodiment, in an implementation mode of the first aspect, the at least one time-domain resource unit may not be configured to transmit at least one of control information or data.

It is to be understood that when transmission cycles of different reference signals are different, there may be only one type of reference signals in a slot or a subframe at some times and there may be multiple types of reference signals at other times. When only one type of pilot signals, for example, Demodulation Reference Signals (DMRSs), are carried in at least one time-domain transmission unit for transmitting the reference signal in a slot or a subframe, a resource reserved for transmitting another type of a reference signal may also not be configured to transmit data and/or control information and may be configured to transmit another type of a reference signal of another terminal device.

It is also to be understood that in the embodiment, the method may be executed by the terminal device and the terminal device for transmitting the reference signal on the at least one time-domain resource unit does not transmit control information and/or data of the terminal device on the at least one time-domain resource unit.

The method may also be executed by the network device. In such case, the at least one time-domain resource unit is configured not to transmit the control information and/or the data but only to transmit the reference signal. Alternatively, the network device may also transmit the reference signal of the terminal device with a certain terminal device on the at least one time-domain resource unit and transmit control information and/or data with another terminal device at a resource position, where the reference signal of the terminal device is not transmitted, of the at least one time-domain resource unit.

In at least one embodiment, in an implementation mode of the first aspect, the method may be executed by the terminal device. The operation that resource information of the at least one time-domain resource unit is determined may include the following action. The terminal device receives the resource information carried in high-layer signaling or the resource information carried in Downlink Control Information (DCI) from the network device. The resource information includes at least one of a position of the at least one time-domain resource unit or the number of the at least one time-domain resource unit.

In at least one embodiment, in an implementation mode of the first aspect, the method may be executed by the network device. After the operation that the resource information of the at least one time-domain resource unit is determined, the method may further include the following operation. The network device sends the resource information carried in the high-layer signaling or the resource information carried in the DCI to the terminal device, and the resource information includes at least one of the position of the at least one time-domain resource unit or the number of the at least one time-domain resource unit.

For example, the network device may carry the resource information of the at least one time-domain resource unit in broadcast information in a broadcast manner, or indicate the resource information of the at least one time-domain resource unit by use of the DCI sent in first N OFDM symbols in a slot for transmitting the reference signal. The first N OFDM symbols are configured to transmit the control information.

In at least one embodiment, the at least one time-domain resource unit may also be predetermined by the terminal device and the network device.

In at least one embodiment, in an implementation mode of the first aspect, a slot or subframe including the at least one time-domain resource unit may further be configured to transmit at least one of control information or data.

In at least one embodiment, in an implementation mode of the first aspect, the operation that the at least one time-domain resource unit for transmitting the reference signal is determined may include the following action. The position of the at least one time-domain resource unit is determined according to at least one of a position of a time-domain resource unit for transmitting the control information or a position of a time-domain resource unit for transmitting the data.

For example, the at least one time-domain resource unit for transmitting the reference signal may be N time-domain resource units located after the time-domain resource unit occupied by the control information, that is, N is the number of the at least one time-domain resource unit for transmitting the reference signal. A value of N may be determined by adopting any abovementioned method. For example, the number of the at least one time-domain resource unit carried in the high-layer signaling or the DCI is sent through the network device. Of course, when there is no time-domain resource unit configured to transmit the control information in the slot or subframe to which the reference signal belongs, the at least one time-domain resource unit for transmitting the reference signal may be first N time-domain resource units in the slot or the subframe.

In at least one embodiment, in an implementation mode of the first aspect, the at least one time-domain resource unit may be located before the time-domain resource unit for transmitting the control information; or the at least one time-domain resource unit may be located before the time-domain resource unit for transmitting the data; or the at least one time-domain resource unit may be located after the time-domain resource unit for transmitting the control information and located before the time-domain resource unit for transmitting the data; or the at least one time-domain resource unit may be at a starting position of the slot or subframe including the at least one time-domain resource unit.

In such a manner, the reference signal may be received as early as possible before a data processing process such as data demodulation, so that the latency brought by reference signal transmission is avoided.

In at least one embodiment, in an implementation mode of the first aspect, a length of each time-domain resource unit in the at least one time-domain resource unit may be determined according to a subcarrier spacing for transmission of the data.

In at least one embodiment, in an implementation mode of the first aspect, a subcarrier spacing for transmission of the reference signal may be different from the subcarrier spacing for transmission of the data.

In at least one embodiment, in an implementation mode of the first aspect, the at least one time-domain resource unit may be configured to transmit multiple types of reference signals, and different types of the reference signals may correspond to different transmission parameters. The transmission parameter may include at least one of: a subcarrier spacing for transmission of the reference signal, a transmission bandwidth for transmission of the reference signal, a precoding matrix for precoding the reference signal or a beam parameter for beamforming the reference signal.

Specifically, the terminal device and the network device may transmit multiple types of the reference signals in the at least one time-domain resource unit and may transmit different types of the reference signals by use of different subcarrier spacings. The terminal device and the network device may also transmit different types of the reference signals by use of different transmission bandwidths. The terminal device and the network device may further precode different types of the reference signals by use of different precoding matrixes or perform beamforming on different types of the reference signals by use of different beams.

In at least one embodiment, in an implementation mode of the first aspect, the at least one time-domain resource unit may be configured to transmit multiple types of the reference signals and different types of the reference signals may be transmitted in a Time Division Multiplexing (TDM) manner or a FDM manner.

In at least one embodiment, in an implementation mode of the first aspect, the time-domain resource unit may be an OFDM symbol.

In at least one embodiment, in an implementation mode of the first aspect, the reference signal may be at least one of the following types: a Channel State Information Reference Signal (CSI-RS), a DMRS, a Sounding Reference Signal (SRS), a Phase Tracking Reference Signal (PTRS) or a Beam-specific Reference Signal (BRS).

A second aspect provides a communication device, which may be configured to execute each process executed by a terminal device or a network device in the method for transmitting a reference signal in the first aspect and each implementation mode. The communication device includes a determination unit and a transmission unit. The determination unit is configured to determine at least one time-domain resource unit for transmitting a reference signal. The transmission unit is configured to transmit the reference signal on the at least one time-domain resource unit determined by the determination unit.

A third aspect provides a communication device, which may be configured to execute each process executed by a terminal device or a network device in the method for transmitting a reference signal in the first aspect and each implementation mode. The communication device includes a processor and a transceiver. The processor is configured to determine at least one time-domain resource unit for transmitting a reference signal. The transceiver is configured to transmit the reference signal on the at least one time-domain resource unit determined by the processor.

A fourth aspect provides a computer-readable storage medium, which stores a program. The program enables a terminal device or a network device to execute any method for transmitting a reference signal in the first aspect and each implementation mode thereof.

According to the method for transmitting a reference signal of the embodiment of the disclosure, the reference signal is transmitted in first specific OFDM symbols, so that the latency brought by reference signal transmission may be reduced. Therefore, the latency in data demodulation or CSI measurement is reduced, and meanwhile, the control signaling overhead for indicating the rate-matching resource and the rate-matching complexity may also be reduced.

DETAILED DESCRIPTION

The technical solutions in the embodiments of the disclosure will be described below in combination with the drawings.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, an LTE system, an LTE Frequency Division Duplex (FDD) system, LTE Time Division Duplex (TDD), a Universal Mobile Telecommunication System (UMTS) or a future 5th-Generation (5G) communication system.

Each embodiment of the disclosure is described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

Each embodiment of the disclosure is described in combination with a network device. The network device may be a device configured to communicate with the terminal device, for example, may be a Base Transceiver Station (BTS) in the GSM or the CDMA, may also be a NodeB (NB) in the WCDMA system and may also be an Evolutional Node B (eNB or eNodeB) in the LTE system. Alternatively, the network device may be a relay station, an access point, a vehicle-mounted device, a wearable device, a network-side device in a future 5G network, a network device in a future evolved Public Land Mobile Network (PLMN) or the like.

In the embodiments of the disclosure, a reference signal is also called a pilot signal.

Figure 1:
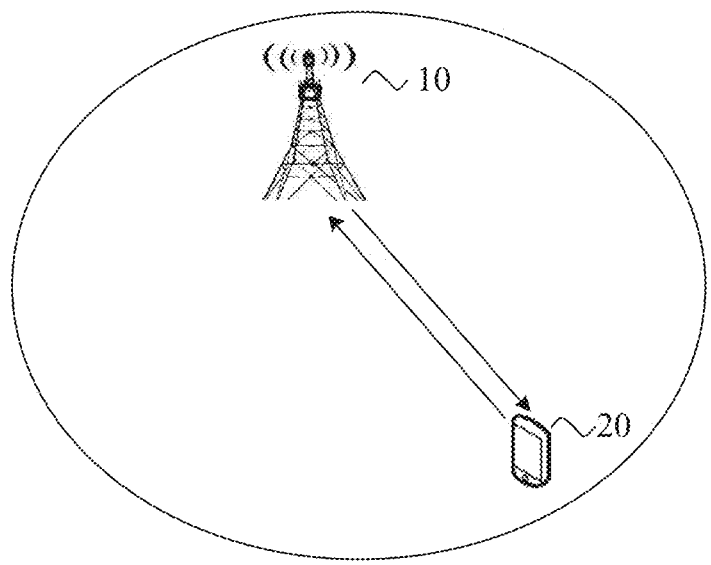
FIG. 1 is a schematic architecture diagram of an application scenario according to an embodiment of the disclosure.

FIG. 1 is a schematic diagram of an application scenario according to the disclosure. A communication system in FIG. 1 may include a network device 10 and a terminal device 20. The network device 10 is configured to provide communication service for the terminal device 20 and access to a core network. The terminal device 20 searches a synchronization signal, broadcast signal and the like sent by the network device 10 to access the network, thereby communicating with the network. Arrows illustrated in FIG. 1 may represent uplink/downlink transmission implemented through a cellular link between the terminal device 20 and the network device 10. A network in the embodiments of the disclosure may refer to a PLMN or a Device to Device (D2D) network or a Machine to Machine/Man (M2M) network or another network. FIG. 1 is only an exemplary simplified schematic diagram. The network may further include another terminal device which is not illustrated in FIG. 1.

Figure 2:
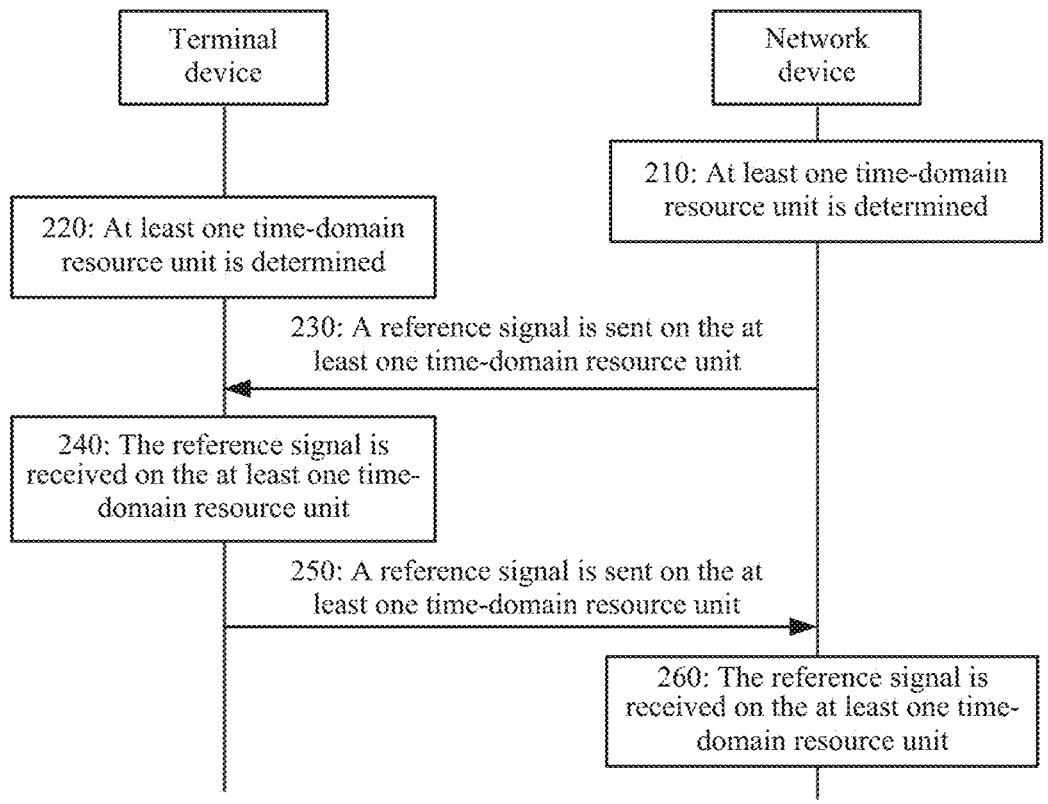
FIG. 2 is an interaction flowchart of a method for transmitting a reference signal according to an embodiment of the disclosure.

FIG. 2 is an interaction flowchart of a method for transmitting a reference signal according to an embodiment of the disclosure. FIG. 2 illustrates a network device and a terminal device. The network device may be, for example, the network device 10 illustrated in FIG. 1 and the terminal device may be, for example, the terminal device 20 illustrated in FIG. 1. In the embodiment of the disclosure, a reference signal is multiplexed and transmitted in a specific OFDM symbol and the specific OFDM symbol is an OFDM symbol dedicated for transmitting the reference signal, so that the reference signal may be timely received to reduce a latency in data demodulation or CSI measurement based on the reference signal, and meanwhile, a control signaling overhead for indicating a rate-matching resource and rate-matching complexity may also be reduced. As illustrated in FIG. 2, a specific flow for transmitting a reference signal includes the following operations.

In 210, a network device determines at least one time-domain resource unit for transmitting a reference signal.

Specifically, the network device, before transmitting the reference signal with a terminal device, may determine the at least one time-domain resource unit configured to transmit the reference signal, and send the reference signal to the terminal device on the at least one time-domain resource unit or receive a reference signal sent by the terminal device on the at least one time-domain resource unit.

In 220, a terminal device determines at least one time-domain resource unit for transmitting a reference signal.

Similarly, the terminal device, before transmitting the reference signal with the network device, may also determine the at least one time-domain resource unit configured to transmit the reference signal, and receive the reference signal sent by the network device on the at least one time-domain resource unit or send the reference signal to the network device on the at least one time-domain resource unit.

The at least one time-domain resource unit is one or multiple time-domain resource units for transmitting the reference signal and may be configured to transmit at least one type of reference signals. That is, the at least one time-domain resource unit may be configured to transmit the reference signal and may also be configured to transmit a reference signal of another type, except the reference signal.

By comparison, the reference signal is not transmitted by multiplexing part of subcarriers on a time-domain resource unit for transmitting data, but transmitted through the at least one specific time-domain resource unit, so that a reference signal transmission latency is reduced. Therefore, the latency in data demodulation or CSI measurement based on the reference signal is reduced, and meanwhile, a control signaling overhead for indicating a rate-matching resource and rate-matching complexity are also reduced.

The reference signal may be the reference signal of the terminal device and may also be a reference signal of another terminal device. Therefore, the at least one time-domain resource unit may include one or multiple time-domain resource units, configured to transmit the reference signal, of the terminal device and may also include one or multiple time-domain resource units reserved for the other terminal device to transmit the reference signal.

In at least one embodiment, the time-domain resource unit may be an OFDM symbol.

It is to be understood that the time-domain resource unit may also be a mini-slot, a slot or another time-domain resource unit defined in a 5G system. There are no limits made thereto in the disclosure.

In at least one embodiment of the disclosure, the reference signal may include at least one of: a CSI-RS, a DMRS, an SRS, a PTSR or a BRS.

It is also to be understood that in the embodiment of the disclosure, transmission of the reference signal may be sending of the reference signal to the network device by the terminal device, i.e., transmission of an uplink reference signal, and may also be sending of the reference signal to the terminal device by the network device, i.e., transmission of a downlink reference signal.

In at least one embodiment, the at least one time-domain resource unit for transmitting the reference signal is not configured to transmit control information and/or data.

It is to be understood that in the embodiment, the method may be executed by the terminal device and the terminal device transmitting the reference signal on the at least one time-domain resource unit does not transmit the control information and/or data of the terminal device on the at least one time-domain resource unit.

The method may also be executed by the network device. In such case, the at least one time-domain resource unit is configured not to transmit the control information and/or the data but only to transmit the reference signal. Alternatively, the network device may also transmit the reference signal of the terminal device with a certain terminal device on the at least one time-domain resource unit and transmit the control information and/or the data with another terminal device at a resource position where the reference signal of the terminal device is not transmitted in the at least one time-domain resource unit.

For example, it is assumed that all physical resources in the time-domain resource unit are not configured to transmit the data of the terminal device. During resource mapping for the data, the terminal device is required to perform rate-matching on all the physical resources in the at least one time-domain resource unit. For example, when the time-domain resource unit for transmitting the reference signal is a third OFDM symbol in a slot and first two OFDM symbols are configured to transmit the control information, resource mapping for the data may be started from a fourth OFDM symbol only.

It is assumed that all the physical resources in the time-domain resource unit are not configured to transmit the control information of the terminal device. During physical resource allocation for the control information, the network device may not configure the at least one time-domain resource unit for the terminal device to transmit the control information for the terminal device. For example, when the time-domain resource unit for transmitting the reference signal includes one OFDM symbol and two OFDM symbols are required for transmission of the control information, the reference signal may be transmitted on a first OFDM symbol of a slot and the control information is transmitted on a second OFDM symbol and third OFDM symbol of the slot, or the control information may be transmitted on the first OFDM symbol and second OFDM symbol of the slot and the reference signal is transmitted on the third OFDM symbol of the slot.

When transmission cycles of different reference signals are different, there may be only one type of reference signals in a slot or a subframe at some times and there may be multiple types of reference signals at other times. When only one type of pilot signals, for example, DMRSs, are carried in at least one time-domain transmission unit for transmitting the reference signal in a slot or a subframe, a resource reserved for transmitting another type of a reference signal may also not be configured to transmit the data and/or the control information, but may be configured to transmit another type of a reference signal of another terminal device.

In the operations in 210 and 220, the at least one time-domain resource unit may be predetermined by the terminal device and the network device. The terminal device and the network device may directly transmit the reference signals on the predetermined at least one time-domain resource unit. For example, it may be predetermined in a protocol that when the control information is required to be transmitted on a slot, the third OFDM symbol of the slot is configured to transmit the reference signal, otherwise the first OFDM symbol of the slot is configured to transmit the reference signal.

The at least one time-domain resource unit for transmitting the reference signal may also be determined and notified to the terminal device by the network device. The network device may independently determine the at least one time-domain resource unit and send resource information of the configured at least one time-domain resource unit to the terminal device, so that the terminal device may acquire the at least one time-domain resource unit for transmitting the reference signal from the received resource information.

Figure 3:
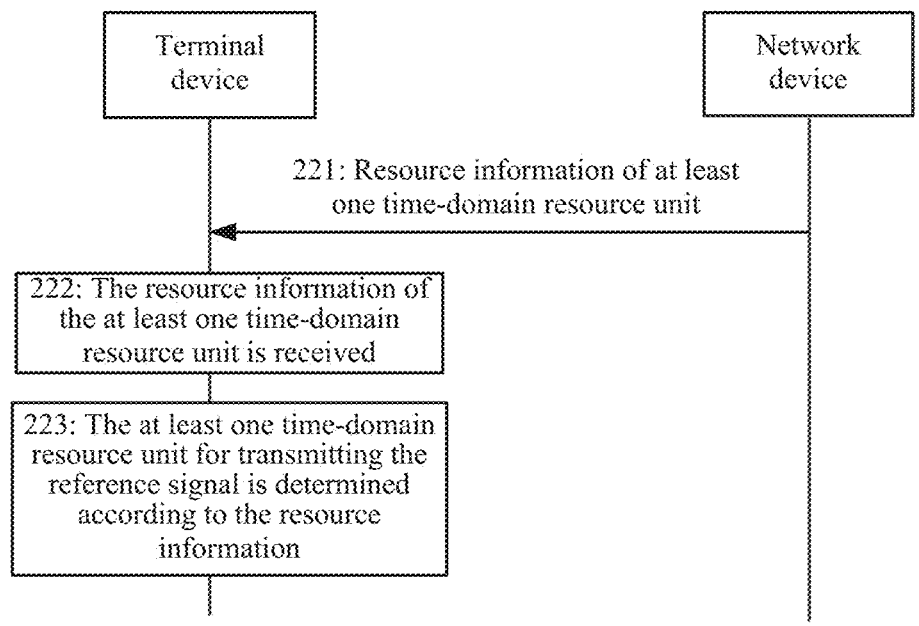
FIG. 3 is an interaction flowchart of a method for transmitting a reference signal according to an embodiment of the disclosure.

For example, according to the method for transmitting a reference signal of the embodiment of the disclosure illustrated in FIG. 3, the terminal device may receive the resource information of the at least one time-domain resource unit from the network device to determine a position and/or number of the at least one time-domain resource unit. That is, before the operation in 220, the method may include the operations in 221 and 222 and the operation in 220 may be replaced with the operation in 223.

In 221, the network device sends resource information of the at least one time-domain resource unit to the terminal device.

Herein, the resource information includes the position of the at least one time-domain resource unit and/or the number of the at least one resource unit.

In 222, the terminal device receives the resource information sent by the network device.

In 223, the terminal device determines the at least one time-domain resource unit for transmitting the reference signal according to the resource information.

In at least one embodiment, the network device may send the resource information carried in high-layer signaling to the terminal device, so that the terminal device, after receiving the resource information carried in the high-layer signaling from the network device, may determine the at least one time-domain resource unit for transmitting the reference signal according to the high-layer signaling. For example, the network device may carry the resource information of the at least one time-domain resource unit in broadcast information in a broadcast manner.

In at least one embodiment, the network device may send the resource information carried in DCI to the terminal device, so that the terminal device, after receiving the resource information carried in the DCI from the network device, may determine the at least one time-domain resource unit for transmitting the reference signal according to the DCI.

For example, the resource information of the at least one time-domain resource unit is indicated by the DCI sent in first N OFDM symbols of the slot for transmitting the reference signal, the N OFDM symbols being for transmitting the control information.

In at least one embodiment, a slot or subframe to which the at least one time-domain resource unit belongs is further configured to transmit the control information and/or the data.

For example, the terminal device may transmit the control information and/or data of the terminal device on other time-domain resource units in the slot or subframe to which the at least one time-domain resource unit belongs. The network device may also transmit the control information and/or the data with the terminal device or another terminal device on other time-domain resource units in the slot or subframe to which the at least one time-domain resource unit belongs. When an OFDM symbol occupied by the at least one time-domain resource unit in the corresponding slot is a third OFDM symbol, a first OFDM symbol and second OFDM symbol of the slot may be configured to transmit the control information, and a fourth OFDM symbol to seventh OFDM symbol of the slot may be configured to transmit the data.

In such case, the terminal device or the network device may also determine the position of the at least one time-domain resource unit for transmitting the reference signal according to a position of the time-domain resource unit for transmitting the control information in the corresponding slot or subframe and/or a position of the time-domain resource unit for transmitting the data in the corresponding slot or subframe.

Specifically, the at least one time-domain resource unit for transmitting the reference signal may be N time-domain resource units located after the time-domain resource unit occupied by the control information, that is, N is the number of the at least one time-domain resource unit for transmitting the reference signal. A value of N may be determined by adopting any abovementioned method. For example, the number of the at least one time-domain resource unit carried in the high-layer signaling or the DCI is sent through the network device. Of course, when there is no time-domain resource unit for transmitting the control information in the slot or subframe to which the reference signal belongs, the at least one time-domain resource unit for transmitting the reference signal may be first N time-domain resource units in the slot or the subframe.

For example, when a first OFDM symbol and second OFDM symbol of a slot are occupied by transmission of the control information and the terminal device receives the high-layer signaling sent by the network device or receives the DCI sent on the first two OFDM symbols from the network device to determine that the number of OFDM symbols for transmitting the reference signal is 2, the terminal device may transmit the reference signal on the third and fourth OFDM symbols of the slot.

When the slot or subframe including the at least one time-domain resource unit is further configured to transmit the control information and/or the data, the position of the at least one time-domain resource unit for transmitting the reference signal in the slot or the subframe may be located before the time-domain resource unit for transmitting the control information; or the at least one time-domain resource unit is located before the time-domain resource unit for transmitting the data; or the at least one time-domain resource unit is located after the time-domain resource unit for transmitting the control information and located before the time-domain resource unit for transmitting the data; or the at least one time-domain resource unit is at a starting position of the slot or subframe including the at least one time-domain resource unit.

In such a manner, the terminal device and the network device may receive the reference signal before a data processing process such as data demodulation. Therefore, the latency brought by reference signal transmission is avoided.

In at least one embodiment, a length of each time-domain resource unit in the at least one time-domain resource unit may be determined according to a subcarrier spacing for transmission of the data in the slot or subframe to which the reference signal belongs. That is, the length of each time-domain resource unit is determined based on a subcarrier spacing for transmission of the data in the same slot or the same subframe where the reference signal is transmitted.

Specifically, a correspondence between a subcarrier spacing and a length of a time-domain resource unit may be predetermined by a network-side device and the terminal device, or the terminal device may also directly calculate the length of each time-domain resource unit according to the subcarrier spacing.

Furthermore, the subcarrier spacing for transmission of the reference signal and the subcarrier spacing for transmission of the data may be the same and may also be different. For example, in the slot or the subframe, the subcarrier spacing of 15 kHz is adopted for transmission of the data and the subcarrier spacing of 60 kHz may be adopted for transmission of the reference signal. Under this condition, it is assumed that the length, determined by the subcarrier spacing of 15 kHz, of a time-domain resource unit is A and the length, determined by the subcarrier spacing of 60 kHz, of a time-domain resource unit is A/4. That is, a time-domain resource unit determined by the subcarrier spacing of the data may transmit reference signals of four time-domain resource units. In such case, the four time-domain resource units may be configured for TDM transmission of different types of reference signals.

In at least one embodiment, the at least one time-domain resource unit may be configured to transmit multiple types of reference signals, different types of the reference signals correspond to different transmission parameters and the transmission parameter includes at least one of: a subcarrier spacing for transmission of the reference signal, a transmission bandwidth for transmission of the reference signal, a precoding matrix for precoding the reference signal or a beam parameter for beamforming the reference signal.

Specifically, the terminal device and the network device may transmit the multiple types of reference signals in the at least one time-domain resource unit and may transmit different types of the reference signals by using different subcarrier spacings. Subcarrier spacings for different types of pilot signals may be configured by the network device. For example, a terminal transmits a CSI-RS and a DMRS in an OFDM symbol, the subcarrier spacing of 60 kHz is adopted for the CSI-RS and the subcarrier spacing of 30 kHz is adopted for the DMRS.

The terminal device and the network device may also transmit different types of the reference signals by using different transmission bandwidths. For example, a transmission bandwidth for transmission of the DMRS is usually same as that for data transmission of the terminal device in the corresponding slot or subframe to perform data demodulation and a transmission bandwidth specially configured by the network device through the downlink signaling is usually adopted for another reference signal such as the SRS, the PTRS, the CSI-RS and the BRS.

The terminal device and the network device may further precode different types of the reference signals by using different precoding matrixes or perform beamforming on different types of the reference signals by using different beams. For example, the precoding matrix for transmission of the DMRS is usually a precoding matrix for data transmission of the terminal device in the subframe or slot to which the DMRS belongs, or the terminal device adopts a beam the same as that for the data to beamform the DMRS for data demodulation. For another reference signal such as the SRS, the PTRS, the CSI-RS and the BRS, a beam different from that for the data transmitted by the terminal device may be adopted for beamforming and digital-domain precoding is usually not performed (that is, a unit matrix is adopted as the precoding matrix).

In at least one embodiment, the at least one time-domain resource unit is configured to transmit multiple types of the reference signals and different types of the reference signals may be transmitted in a TDM or FDM manner.

Figure 4A:
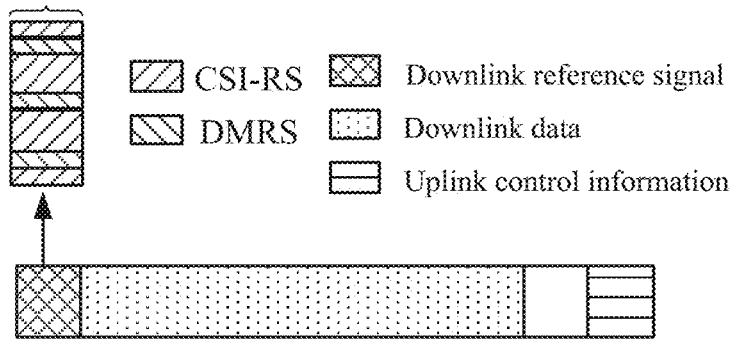
FIG. 4(a) is a schematic diagram of a time-domain resource unit for transmitting a reference signal according to an embodiment of the disclosure.
Figure 4B:
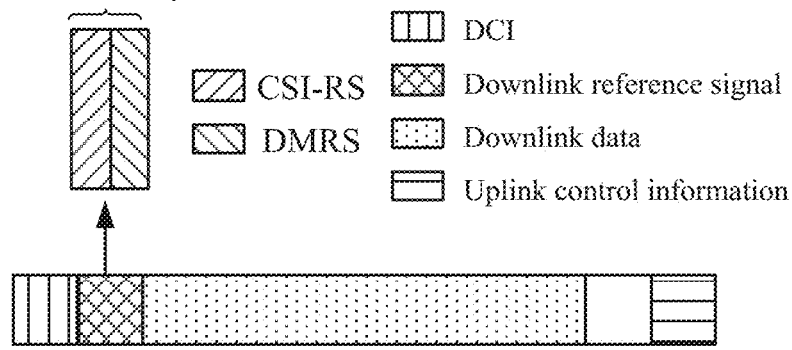
FIG. 4(b) is a schematic diagram of a time-domain resource unit for transmitting a reference signal according to an embodiment of the disclosure.
Figure 4C:
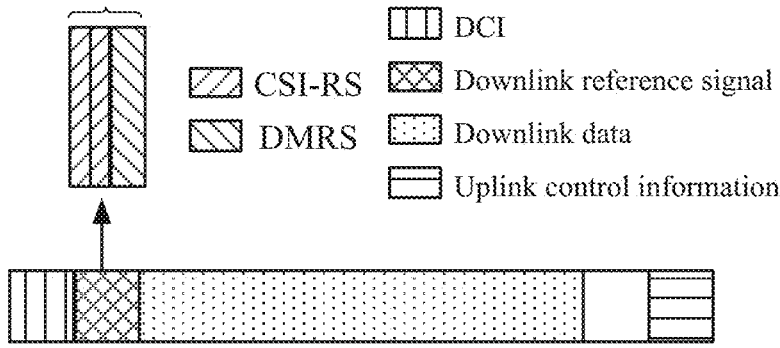
FIG. 4(c) is a schematic diagram of a time-domain resource unit for transmitting a reference signal according to an embodiment of the disclosure.

Specifically, when multiple types of the reference signals are required to be transmitted on the at least one time-domain resource unit, different time-domain resources and/or frequency-domain resources in the at least one time-domain resource unit are occupied by the multiple reference signals. For example, as illustrated in FIG. 4(a), in the present slot, the at least one time-domain resource unit for transmitting the reference signal includes one OFDM symbol, the OFDM symbol is located before the time-domain resource unit for transmitting the downlink data, the terminal device may simultaneously transmit two types of reference signals, i.e., the CSI-RS and the DMRS, in the OFDM symbol, and the CSI-RS and the DMRS occupy different subcarriers in the OFDM symbol. For another example, as illustrated in FIG. 4(b), the OFDM symbol is located after the time-domain resource unit for transmitting the control information and located before the time-domain resource unit for transmitting the downlink data, the terminal device transmits the data by adopting the subcarrier spacing of 15 kHz in the present slot and transmits the SRS and the DMRS in the OFDM symbol in the TDM manner, the subcarrier spacing of 30 kHz is adopted for the DMRS and the SRS and a half OFDM symbol is occupied by each of them. For another example, as illustrated in FIG. 4(c), the terminal device transmits the data by adopting the subcarrier spacing of 15 kHz in the present slot and transmits the CSI-RS and the DMRS in the OFDM symbol in the TDM manner. The subcarrier spacing of 30 kHz is adopted for the DMRS, the subcarrier spacing of 60 kHz is adopted for the CSI-RS, a half OFDM symbol is occupied by each of the CSI-RS and the DMRS, and two CSI-RS sub-symbols may be transmitted in the half OFDM symbol occupied by the CSI-RS.

Figure 4D:
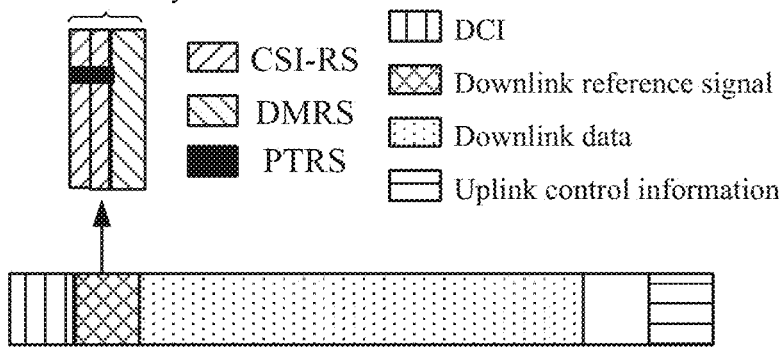
FIG. 4(d) is a schematic diagram of a time-domain resource unit for transmitting a reference signal according to an embodiment of the disclosure.

For another example, when three types of reference signals, such as the CSI-RS, the DMRS and the PTRS, are required to be transmitted on the OFDM symbol, the TDM and OFDM manners may be adopted for transmission. For example, as illustrated in FIG. 4(d), the CSI-RS and the DMRS are transmitted in the OFDM symbol in the TDM manner, a half OFDM symbol is occupied by each of the CSI-RS and the DMRS, two CSI-RS sub-symbols may be transmitted in the half OFDM symbol occupied by the CSI-RS. Further, in the half OFDM symbol for transmitting the CSI-RS, different subcarriers in the half OFDM symbol are occupied by the CSI-RS and the PTRS.

Figure 4E:
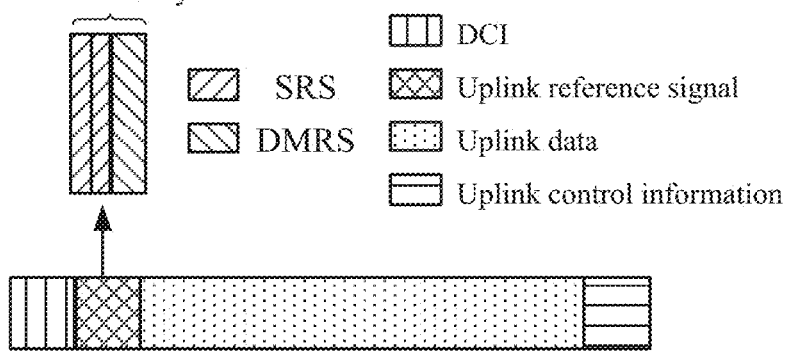
FIG. 4(e) is a schematic diagram of a time-domain resource unit for transmitting a reference signal according to an embodiment of the disclosure.

For another example, for an uplink reference signal, such as the SRS and the DMRS, may also be transmitted in the abovementioned manners. As illustrated in FIG. 4(e), during transmission of the SRS and the DMRS, the terminal device transmits the data by adopting the subcarrier spacing of 15 kHz in the present slot, and transmits the SRS and the DMRS in the OFDM symbol in the TDM manner. The subcarrier spacing of 30 kHz is adopted for the DMRS, the subcarrier spacing of 60 kHz is adopted for the SRS, a half OFDM symbol is occupied by each of the SRS and the DMRS and two SRS sub-symbols may be transmitted in the half OFDM symbol occupied by the SRS.

Based on the above descriptions, after the terminal device and the network device determine a reference signal resource in the operations at 210 and 220, the reference signal may be transmitted therebetween on the at least one time-domain resource unit. When the reference signal is a downlink reference signal such as the CSI-RS, a Cell-specific Reference Signal (CRS) and the DMRS, the operations in 230 and 240 are executed. When the reference signal is an uplink reference signal such as the SRS and an uplink DMRS, the operations 250 and 260 are executed.

In 230, the network device sends reference signal to the terminal device on the at least one time-domain resource unit.

In 240, the terminal device receives the reference signal on the at least one time-domain resource unit.

In 250, the terminal device sends reference signal to the network device on the at least one time-domain resource unit.

In 260, the network device receives the reference signal on the at least one time-domain resource unit.

According to the method for transmitting a reference signal of the embodiment of the disclosure, the reference signal is transmitted in first specific OFDM symbols, so that the reference signal may be timely acquired. Therefore, the latency in data demodulation or CSI measurement is reduced, and meanwhile, the control signaling overhead for indicating the rate-matching resource and the rate-matching complexity may also be reduced.

Figure 5:
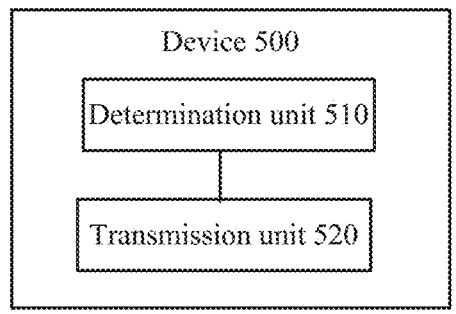
FIG. 5 is a structure block diagram of a communication device according to an embodiment of the disclosure.

FIG. 5 is a schematic block diagram of a communication device 500 according to an embodiment of the disclosure. The communication device may correspond to the terminal device or the network device disclosed in the above method embodiments. As illustrated in FIG. 5, the communication device 500 includes a determination unit 510 and a transmission unit 520.

The determination unit 510 is configured to determine at least one time-domain resource unit for transmitting a reference signal.

The transmission unit 520 is configured to transmit the reference signal on the at least one time-domain resource unit determined by the determination unit 510.

In the embodiment of the disclosure, the reference signal is transmitted in first specific OFDM symbols, so that the reference signal may be timely acquired. Therefore, the latency in data demodulation or CSI measurement is reduced, and meanwhile, a control signaling overhead for indicating a rate-matching resource and rate-matching complexity may also be reduced.

In at least one embodiment, the at least one time-domain resource unit is not configured to transmit control information and/or data.

In at least one embodiment, the communication device is a terminal device, and the transmission unit 520 is further configured to receive resource information carried in high-layer signaling or resource information carried in DCI from a network device. The resource information includes a position of the at least one time-domain resource unit and/or the number of the at least one time-domain resource unit.

In at least one embodiment, the communication device is a network device. The transmission unit 520 is further configured to, after the resource information of the at least one time-domain resource unit is determined, send the resource information carried in the high-layer signaling or the resource information carried in the DCI to the terminal device, the resource information including the position of the at least one time-domain resource unit and/or the number of the at least one time-domain resource unit.

In at least one embodiment, a slot or subframe to which the at least one time-domain resource unit belongs is further configured to transmit control information and/or data.

In at least one embodiment, the determination unit 510 is specifically configured to determine the position of the at least one time-domain resource unit according to a position of a time-domain resource unit for transmitting the control information.

In at least one embodiment, the at least one time-domain resource unit is located before the time-domain resource unit for transmitting the control information. Alternatively, the at least one time-domain resource unit is located before a time-domain resource unit for transmitting the data. Alternatively, the at least one time-domain resource unit is located after the time-domain resource unit for transmitting the control information and located before the time-domain resource unit for transmitting the data. Alternatively, the at least one time-domain resource unit is at a starting position of the slot or subframe including the at least one time-domain resource unit.

In at least one embodiment, a length of each time-domain resource unit in the at least one time-domain resource unit is determined according to a subcarrier spacing for transmission of the data.

In at least one embodiment, a subcarrier spacing for transmission of the reference signal is different from the subcarrier spacing for transmission of the data.

In at least one embodiment, the at least one time-domain resource unit is configured to transmit multiple types of reference signals, and different types of the reference signals correspond to different transmission parameters. The transmission parameter includes at least one of: the subcarrier spacing for transmission of the reference signal, a transmission bandwidth for transmission of the reference signal, a precoding matrix for precoding the reference signal or a beam parameter for beamforming the reference signal.

In at least one embodiment, the time-domain resource unit is an OFDM symbol.

In at least one embodiment, the reference signal is at least one of the following types: a CSI-RS, a DMRS, an SRS, a PTRS or a BRS.

Figure 6:
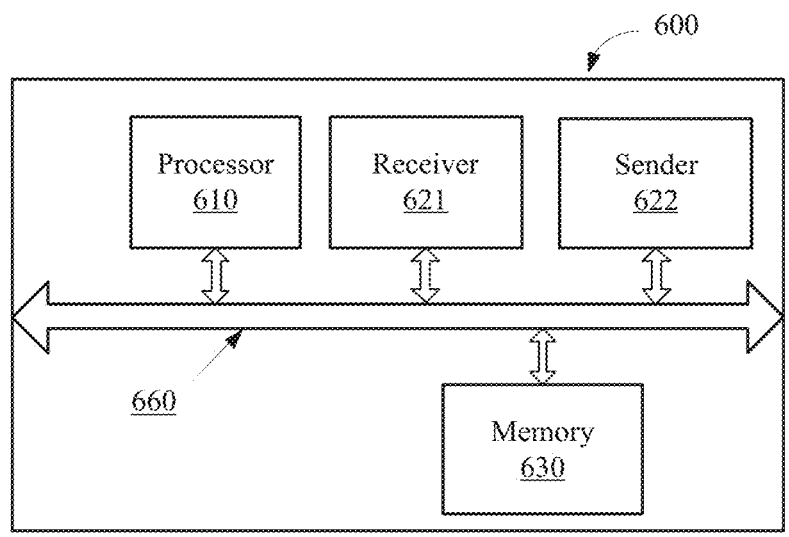
FIG. 6 is a structure block diagram of a communication device according to an embodiment of the disclosure.

It is to be noted that in the embodiment of the disclosure, the transmission unit 520 may be implemented by a transceiver and the determination unit 510 may be implemented by a processor. As illustrated in FIG. 6, a communication device 600 may include a processor 610, a transceiver 620 and a memory 630. The transceiver 620 may include a receiver 621 and a sender 622. The memory 630 may be configured to store related information such as resource information of at least one time-domain resource unit for transmitting a reference signal, and may further be configured to store a code executed by the processor 610 and the like. Components in the communication device 600 are coupled together through a bus system 660. The bus system 660 includes a data bus, and further includes a power bus, a control bus, a state signal bus and the like.

The processor 610 is configured to determine at least one time-domain resource unit for transmitting a reference signal.

The transceiver 620 is configured to transmit the reference signal on the at least one time-domain resource unit determined by the processor 610.

In such a manner, the reference signal is transmitted in first specific OFDM symbols, so that the reference signal may be timely acquired. Therefore, the latency in data demodulation or CSI measurement is reduced, and meanwhile, a control signaling overhead for indicating a rate-matching resource and rate-matching complexity may also be reduced.

In at least one embodiment, the at least one time-domain resource unit is not configured to transmit control information and/or data.

In at least one embodiment, the communication device is a terminal device. The transceiver 620 is further configured to receive resource information carried in high-layer signaling or resource information carried in DCI from a network device, the resource information including a position of the at least one time-domain resource unit and/or the number of the at least one time-domain resource unit.

In at least one embodiment, the communication device is the network device. The transceiver 620 is further configured to, after the resource information of the at least one time-domain resource unit is determined, send the resource information carried in the high-layer signaling or the resource information carried in the DCI to the terminal device, the resource information including the position of the at least one time-domain resource unit and/or the number of the at least one time-domain resource unit.

In at least one embodiment, a slot or subframe to which the at least one time-domain resource unit belongs is further configured to transmit control information and/or data.

In at least one embodiment, the processor 610 is specifically configured to determine a position of the at least one time-domain resource unit according to a position of a time-domain resource unit for transmitting the control information and/or a position of a time-domain resource unit for transmitting the data.

In at least one embodiment, the at least one time-domain resource unit is located before the time-domain resource unit for transmitting the control information. Alternatively, the at least one time-domain resource unit is located before a time-domain resource unit for transmitting the data. Alternatively, the at least one time-domain resource unit is located after the time-domain resource unit for transmitting the control information and located before the time-domain resource unit for transmitting the data. Alternatively, the at least one time-domain resource unit is at a starting position of the slot or subframe including the at least one time-domain resource unit.

In at least one embodiment, a length of each time-domain resource unit in the at least one time-domain resource unit is determined according to a subcarrier spacing for transmission of the data.

In at least one embodiment, a subcarrier spacing for transmission of the reference signal is different from the subcarrier spacing for transmission of the data.

In at least one embodiment, the at least one time-domain resource unit is configured to transmit multiple types of reference signals, and different types of the reference signals correspond to different transmission parameters. The transmission parameter includes at least one of: a subcarrier spacing for transmission of the reference signal, a transmission bandwidth for transmission of the reference signal, a precoding matrix for precoding the reference signal or a beam parameter for beamforming the reference signal.

In at least one embodiment, the time-domain resource unit is an OFDM symbol.

In at least one embodiment, the reference signal is at least one of the following types: a CSI-RS, a DMRS, an SRS, a PTRS or a BRS.

Figure 7:
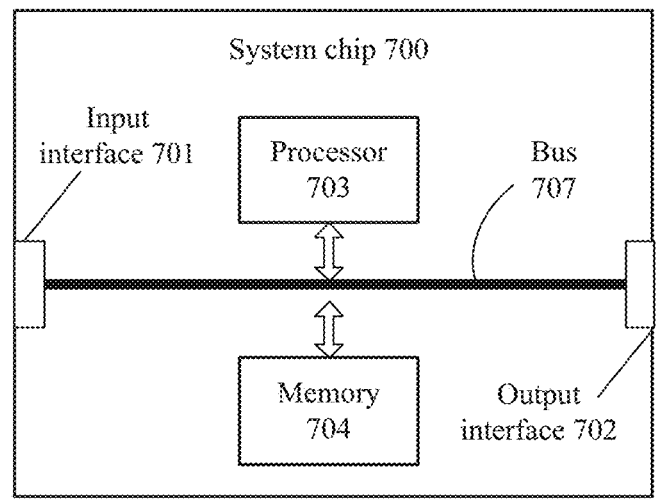
FIG. 7 is a schematic structure diagram of a system chip according to an embodiment of the disclosure.

FIG. 7 is a schematic structure diagram of a system chip according to an embodiment of the disclosure. The system chip 700 of FIG. 7 includes an input interface 701, an output interface 702, at least one processor 703 and a memory 704. The input interface 701, the output interface 702, the processor 703 and the memory 704 are connected through a bus 707. The processor 703 is configured to execute a code in the memory 704. When the code is executed, the processor 703 may implement a method executed by a terminal device or a network device in FIG. 2 to FIG. 5. The bus 707 is only an example of the connection manner. In the embodiment of the disclosure, the input interface 701, the output interface 702, the processor 703 and the memory 704 may also be connected in another manner. There are no limits made herein.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for transmitting a reference signal, comprising:
   determining an orthogonal frequency division multiplexing (OFDM) symbol for transmitting reference signals; and
   transmitting multiple types of reference signals on the OFDM symbol, wherein the multiple types of reference signals comprises a Demodulation Reference Signal (DMRS) and a Beam-specific Reference Signal (BRS), wherein each of the DMRS and the BRS transmitted on the OFDM symbol corresponds to a respective transmission parameter, and each of the transmission parameters comprising a subcarrier spacing for transmission of the DMRS and the BRS.

2. The method of claim 1, wherein the OFDM symbol is not configured to transmit at least one of control information or data.

3. The method of claim 1, wherein the method is executed by a terminal device, and determining the OFDM symbol comprises:
   receiving, by the terminal device, resource information carried in high-layer signaling or resource information carried in Downlink Control Information (DCI) from a network device, the resource information comprising a position of the OFDM symbol; and
   determining, by the terminal device according to the resource information, the OFDM symbol.

4. The method of claim 1, wherein the method is executed by a network device, and after determining the OFDM symbol, the method further comprises:
   sending, by the network device, resource information carried in high-layer signaling or resource information carried in DCI to a terminal device, the resource information comprising a position of the OFDM symbol.

5. The method of claim 1, wherein a slot or subframe comprising the OFDM symbol is further configured to transmit at least one of control information or data.

6. The method of claim 5, wherein determining the OFDM symbol for transmitting the reference signals comprises:
determining a position of the OFDM symbol for transmitting the reference signals according to at least one of a position of an OFDM symbol for transmitting the control information or a position of an OFDM symbol for transmitting the data.

7. The method of claim 5, wherein
the OFDM symbol for transmitting the reference signals is located before the OFDM symbol for transmitting the control information; or
the OFDM symbol for transmitting the reference signals is located before the OFDM symbol for transmitting the data; or
the OFDM symbol for transmitting the reference signals is located after the OFDM symbol for transmitting the control information and located before the OFDM symbol for transmitting the data; or
the OFDM symbol for transmitting the reference signals is at a starting position of the slot or subframe comprising the OFDM symbol for transmitting the reference signals.

8. The method of claim 1, wherein the transmission parameter further comprises at least one of:
transmission bandwidths for transmission of the reference signals,
precoding matrixes for precoding the reference signals, or
beam parameters for beamforming the reference signals.

9. A communication device, comprising:
a processor, configured to determine an orthogonal frequency division multiplexing (OFDM) symbol for transmitting reference signals; and
a transceiver, configured to transmit multiple types of reference signals simultaneously on the OFDM symbol determined by the processor, wherein the multiple types of reference signals comprises a Demodulation Reference Signal (DMRS) and a Beam-specific Reference Signal (BRS),
wherein each of the DMRS and the BRS corresponds to a respective transmission parameter, and each of the transmission parameters comprising a subcarrier spacing for transmission of the DMRS and the BRS.

10. The communication device of claim 9, wherein the OFDM symbol is not configured to at least one of transmit control information or data.

11. The communication device of claim 9, wherein the communication device is a terminal device, and the transceiver is further configured to:
receive resource information carried in high-layer signaling or resource information carried in Downlink Control Information (DCI) from a network device, the resource information comprising a position of the OFDM symbol.

12. The communication device of claim 9, wherein the communication device is a network device, and the transceiver is further configured to:
after the OFDM symbol is determined, send resource information carried in high-layer signaling or resource information carried in DCI to a terminal device, the resource information comprising a position of the OFDM symbol.

13. The communication device of claim 9, wherein a slot or subframe comprising the OFDM symbol is further configured to transmit at least one of control information or data.

14. The communication device of claim 13, wherein the processor is specifically configured to:
determine a position of the OFDM symbol for transmitting the reference signals according to at least one of a position of an OFDM symbol for transmitting the control information or a position of an OFDM symbol for transmitting the data.

15. The communication device of claim 13, wherein the OFDM symbol for transmitting the reference signals is located before the OFDM symbol for transmitting the control information; or
the OFDM symbol for transmitting the reference signals is located before the OFDM symbol for transmitting the data; or
the OFDM symbol for transmitting the reference signals is located after the OFDM symbol for transmitting the control information and located before the OFDM symbol for transmitting the data; or
the OFDM symbol for transmitting the reference signals is at a starting position of the slot or subframe comprising the OFDM symbol for transmitting the reference signals.

16. The communication device of claim 9, wherein the transmission parameter further comprises at least one of:
transmission bandwidths for transmission of the reference signals,
precoding matrixes for precoding the reference signals, or
beam parameters for beamforming the reference signals.

17. A non-transitory computer-readable storage medium, comprising a computer-executable instruction that, when executed by a processor, causes the processor to execute a method for transmitting a reference signal, the method comprising:
determining an orthogonal frequency division multiplexing (OFDM) symbol for transmitting reference signals; and
transmitting multiple types of reference signals on the OFDM symbol simultaneously, wherein the multiple types of reference signals comprises a Demodulation Reference Signal (DMRS) and a Beam-specific Reference Signal (BRS),
wherein each of the DMRS and the BRS corresponds to a respective transmission parameter, and each of the transmission parameters comprising a subcarrier spacing for transmission of the DMRS and the BRS.

18. The method of claim 1, wherein the subcarrier spacing is one of 15 kHz, 30 kHz or 60 kHz.

19. The device of claim 9, wherein the subcarrier spacing is one of 15 kHz, 30 kHz or 60 kHz.

20. The non-transitory computer-readable storage medium of claim 17, wherein the subcarrier spacing is one of 15 kHz, 30 kHz or 60 kHz.

* * * * *